(12) United States Patent
Shimazu et al.

(10) Patent No.: US 7,120,331 B2
(45) Date of Patent: Oct. 10, 2006

(54) OPTICAL DEVICE AND PRODUCTION METHOD THEREOF

(75) Inventors: Takayuki Shimazu, Yokohama (JP); Tomohiko Kanie, Yokohama (JP); Makoto Katayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/068,037

(22) Filed: Mar. 1, 2005

(65) Prior Publication Data

US 2005/0191005 A1   Sep. 1, 2005

Related U.S. Application Data

(60) Provisional application No. 60/548,877, filed on Mar. 2, 2004.

(30) Foreign Application Priority Data

Mar. 1, 2004  (JP) ............ P2004-056514
Feb. 22, 2005 (JP) ............ P2005-046068

(51) Int. Cl.
   *G02B 6/26* (2006.01)
(52) U.S. Cl. ............ 385/25; 385/16; 385/17
(58) Field of Classification Search ............ None
See application file for complete search history.

(56) References Cited

U.S. PATENT DOCUMENTS 6,404,942 B1   6/2002  Edwards et al.
6,643,426 B1 * 11/2003 McDonald ............ 385/18
7,006,722 B1 *  2/2006 Kurumada et al. ........ 385/18
2003/0117038 A1  6/2003 Marxer
2003/0123786 A1 * 7/2003 Yee ............ 385/16
2004/0008921 A1  1/2004 Kanie et al.
2005/0062565 A1 * 3/2005 Chou ............ 335/78

FOREIGN PATENT DOCUMENTS

JP   2003-24118   8/2003

* cited by examiner

*Primary Examiner*—Sung Pak
(74) *Attorney, Agent, or Firm*—McDermott Will & Emery LLP

(57) ABSTRACT

An optical device according to an embodiment of the present invention has an actuator structure. The actuator structure has a substrate, a stationary electrode, a movable electrode, an optical element, and a hole portion. The stationary electrode is provided on a surface of the substrate. The movable electrode is provided on the surface of the substrate. The optical element is provided on the movable electrode. The substrate faces the movable electrode. The hole portion is formed in a part of the substrate. A region near the movable electrode where the optical element is provided is immersed in a matching oil.

18 Claims, 10 Drawing Sheets

Fig.5
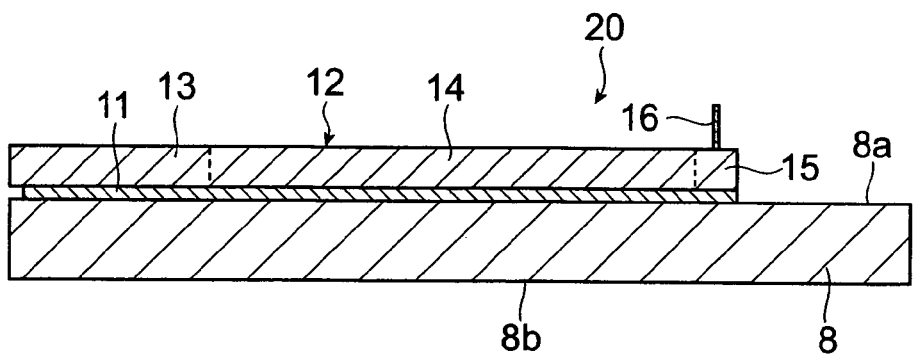
(a)
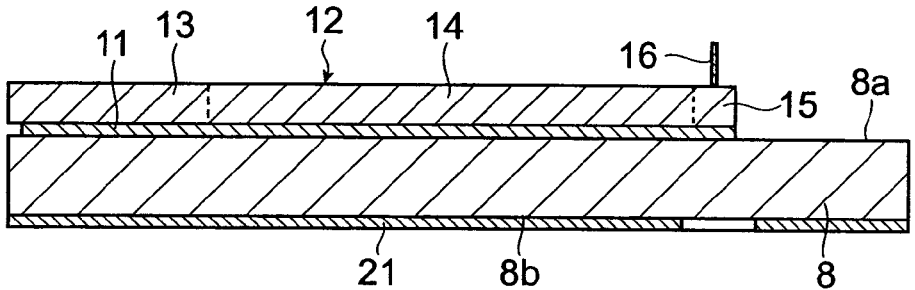
(b)
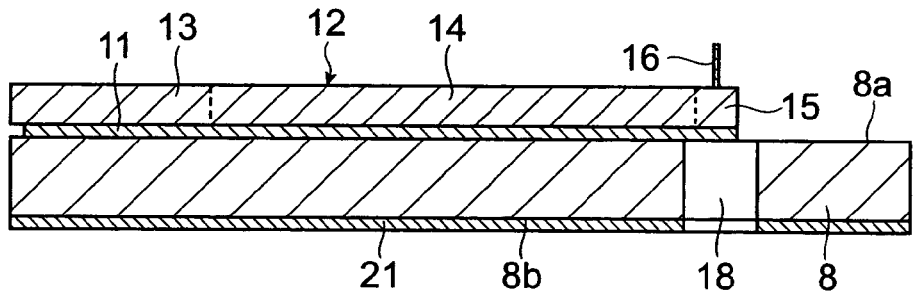
(c)
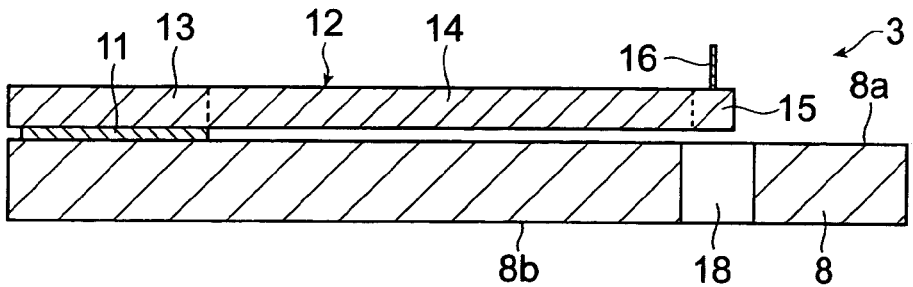
(d)

OPTICAL DEVICE AND PRODUCTION METHOD THEREOF

CROSS-REFERENCE TO RELATED APPLICATION

This application claims priority to Provisional Application Ser. No. 60/548,877 filed on Mar. 2, 2004, which is hereby incorporated by reference in their entirety.

BACKGROUND OF THE INVENTION

1. Field of the Invention

The present invention relates to an optical device with an actuator structure having an optical element such as a mirror, and to a production method thereof.

2. Related Background of the Invention

A well-known optical device with an actuator structure is an optical switch, for example, as described in Japanese Patent Application Laid-Open No. 2003-241118. This optical switch is provided with an electrode and a movable member. The electrode is fixed to a base. The movable member has a mirror at the tip thereof and is fixed to the base. In this optical switch, the movable member is moved relative to the electrode to move the mirror.

SUMMARY OF THE INVENTION

In the optical device as described above, it is necessary to minimize an insertion loss in an operation of guiding light emerging from an optical waveguide, into another optical waveguide. There are also strong desires for reduction of a switching time by increasing a driving speed of the movable member.

An object of the present invention is to provide an optical device capable of increasing the driving speed of the actuator structure while achieving the reduction of optical loss, and a production method thereof.

An optical device according to the present invention is an optical device comprising an actuator structure, wherein the actuator structure comprises: a substrate; a stationary electrode provided on a surface of the substrate; a movable electrode provided on the surface of the substrate; an optical element provided on the movable electrode; and a hole portion formed in a part of the substrate where the substrate faces the movable electrode, wherein a region in the vicinity of the movable electrode where the optical element is provided is immersed in a matching oil.

In the optical device of the present invention, the region near the movable electrode where the optical element (e.g., a mirror) is provided is immersed in the matching oil as described above; therefore, for example, in a case where light emerging from an optical waveguide is reflected by a mirror to be guided into another optical waveguide, the refractive index between the optical waveguides and the mirror is matched with the refractive index of the core part of the optical waveguides. The insertion loss of light can be reduced accordingly.

Incidentally, movement of the movable electrode of the actuator structure results in imparting shear stress (shear resistance) on the matching oil. As the distance decreases between the substrate and an opposed surface to the substrate, e.g., the movable electrode, the shear stress increases to resist motion of the movable electrode. The movable electrode faces the substrate and the hole portion is formed in that part of the substrate, whereby the part where the hole portion is formed has an enlarged space on the substrate side with respect to the movable electrode, so as to decrease the shear stress occurring in motion of the movable electrode. This permits increase of the driving speed of the movable electrode. Furthermore, in a case where the hole portion is formed in the part of the substrate facing the tip end of the movable electrode and where the movable electrode is formed through a sacrifice layer on the surface of the substrate, when the sacrifice layer is finally removed with an etchant in order to facilitate the motion of the movable electrode, it is also feasible to prevent occurrence of stiction to cause sticking of the substrate and the movable electrode due to surface tension of the etchant.

Preferably, the part of the substrate is a part facing the optical element in the substrate. The part of the substrate may be a part facing the movable electrode in the substrate.

Preferably, the hole portion is a through hole. For example, where a microscopic actuator structure is fabricated by use of the Micro-Electro-Mechanical System (MEMS), the through hole (hole portion) is formed, for example, by etching, whereby the hole portion can be formed in the substrate without difficulty and with good position accuracy.

Another optical device of the present invention is an optical device comprising an actuator structure, wherein the actuator structure comprises: a substrate; a stationary electrode provided on a surface of the substrate; a movable electrode provided on the surface of the substrate and provided with a portion extending out from an end face of the substrate; and an optical element provided on the portion of the movable electrode extending out from the end face of the substrate, wherein a region in the vicinity of the movable electrode where the optical element is provided is immersed in a matching oil.

In the present invention, as described above, the region near the movable electrode where the optical element (e.g., a mirror) is provided is immersed in the matching oil; therefore, for example, in a case where light emerging from an optical waveguide is reflected by a mirror to be guided into another optical waveguide, the refractive index between the optical waveguides and the mirror is matched with the refractive index of the core part of the optical waveguides, whereby the insertion loss of light can be reduced.

Incidentally, movement of the movable electrode of the actuator structure results in imparting shear stress (shear resistance) on the matching oil. As the distance decreases between the substrate and an opposed surface to the substrate, e.g., the movable electrode, the shear stress increases to resist motion of the movable electrode. Thus the movable electrode is provided on the surface of the substrate and with the portion extending out from the end face of the substrate, so as to secure an enlarged space on the substrate side with respect to the tip end of the movable electrode, which decreases the shear stress occurring in motion of the movable electrode. This permits increase of the driving speed of the movable electrode. By adopting such a configuration, furthermore, in a case where the movable electrode is formed through a sacrifice layer on the surface of the substrate, when the sacrifice layer is finally removed with an etchant in order to facilitate the motion of the movable electrode, it is also feasible to prevent occurrence of stiction to cause sticking of the substrate and the movable electrode due to surface tension of the etchant.

Preferably, a space between a plane along the surface of the substrate and a plane of the movable electrode facing the substrate is not more than 10 μm. This configuration can effectively exert the effect achieved by the formation of the hole portion in the substrate or by providing the movable electrode with the portion extending out from the end face of the substrate.

A production method of an optical device according to the present invention is a method of producing an optical device, the method comprising: a step of providing a stationary electrode on a surface of a substrate; a step of providing a movable electrode on the surface of the substrate; a step of providing an optical element on the movable electrode; a step of forming a hole portion in the substrate where the substrate has a part facing the movable electrode; and a step of immersing a region in the vicinity of the movable electrode where the optical element is provided, in a matching oil.

When the hole portion is formed in the substrate having the part facing the movable electrode as described above, the part where the hole portion is formed has an enlarged space on the substrate side with respect to the movable electrode, so as to decrease the shear stress occurring in motion of the movable electrode. This permits increase of the driving speed of the movable electrode. In a case where the hole portion is formed in a part of the substrate facing the distal end of the movable electrode and where the movable electrode is formed through a sacrifice layer on the surface of the substrate, when the sacrifice layer is finally removed with an etchant, it is also feasible to prevent occurrence of stiction to cause sticking of the substrate and the movable electrode due to surface tension of the etchant. Furthermore, when the region near the movable electrode where the optical element is provided is immersed in the matching oil, matching of refractive indices is achieved, so as to enable reduction of the insertion loss of light.

Preferably, the hole portion is formed by removing the substrate from the back surface thereof. For example, where a microscopic actuator structure is fabricated by use of the Micro-Electro-Mechanical System (MEMS), the hole portion is formed, for example, by etching, whereby the hole portion can be formed in the substrate without difficulty and with good position accuracy.

In this case, preferably, the movable electrode is formed through a sacrifice layer on the surface of the substrate, etching is effected from a back surface of the substrate to form the hole portion, and thereafter the sacrifice layer is removed. In this case, the sacrifice layer is left during the etching, and thus the movable electrode is prevented from being etched. This makes it feasible to securely prevent damage of the movable electrode.

The hole portion may be preliminarily formed in the substrate, prior to the step of providing the movable electrode on the surface of the substrate.

Another production method of an optical device according to the present invention is a method of producing an optical device, the method comprising: a step of providing a stationary electrode on a surface of a substrate; a step of providing a movable electrode on the surface of the substrate so as to have a portion extending out from an end face of the substrate; a step of providing an optical element on the movable electrode; and a step of immersing a region near the movable electrode where the optical element is provided, in a matching oil.

When the movable electrode is provided on the surface of the substrate so as to have the portion extending out from the end face of the substrate as described above, an enlarged space is secured on the substrate side with respect to the tip end of the movable electrode, so as to decrease the shear stress occurring in motion of the movable electrode. This permits increase of the driving speed of the movable electrode. In a case where the movable electrode is formed through a sacrifice layer on the surface of the substrate, when the sacrifice layer is finally removed with an etchant, it is also feasible to prevent occurrence of stiction to cause sticking of the substrate and the movable electrode due to surface tension of the etchant. Furthermore, when the region near the movable electrode where the optical element is provided is immersed in the matching oil, matching of refractive indices is achieved, so as to enable reduction of the insertion loss of light.

BRIEF DESCRIPTION OF THE DRAWINGS

FIGS. 5(a) through 5(d) are sectional views showing steps of producing the actuator structure shown in FIG. 3.

DESCRIPTION OF THE PREFERRED EMBODIMENTS

The preferred embodiments of the optical device and the production method thereof according to the present invention will be described below with reference to the drawings.

Figure 1:
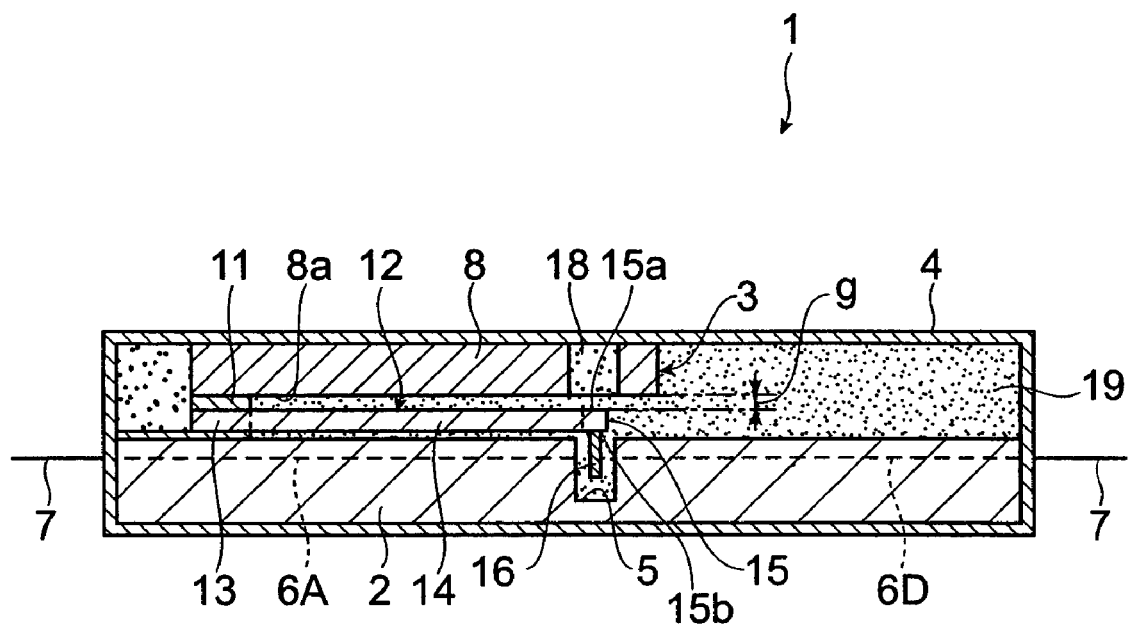
FIG. 1 is a vertical sectional view showing an embodiment of an optical device according to the present invention.

FIG. 1 is a vertical sectional view showing an optical switch as an embodiment of the optical device according to the present invention. The optical switch 1 shown in FIG. 1 has a planar optical waveguide 2 made of silica glass or the like, and an actuator structure 3 placed on this planar optical waveguide 2. These planar optical waveguide 2 and actuator structure 3 are housed in a package 4.

Figure 2:
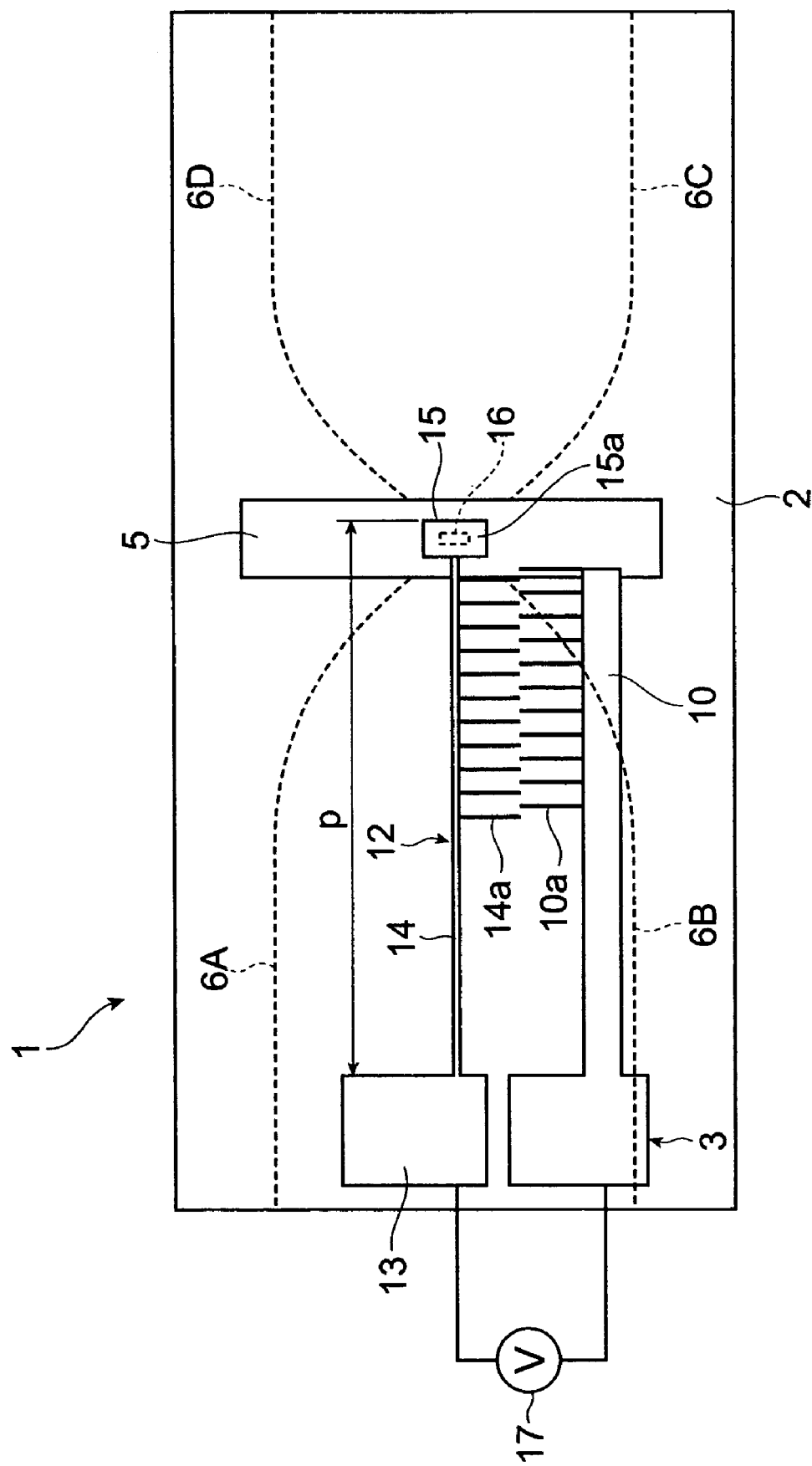
FIG. 2 is a horizontal sectional view showing a part of the optical device shown in FIG. 1.

The planar optical waveguide 2, as shown in FIGS. 1 and 2, has a trench 5 opening up, and optical waveguide cores 6A–6D formed so as to be coupled with this trench 5. The optical waveguide cores 6A–6D are connected to optical fibers 7 guided out to the outside of the package 4. Namely, one end of each of the optical waveguide cores 6A–6D is located at a side wall defining the trench 5, and the other end of each of the optical waveguide cores 6A–6D is optically coupled to an optical fiber 7.

Figure 3:
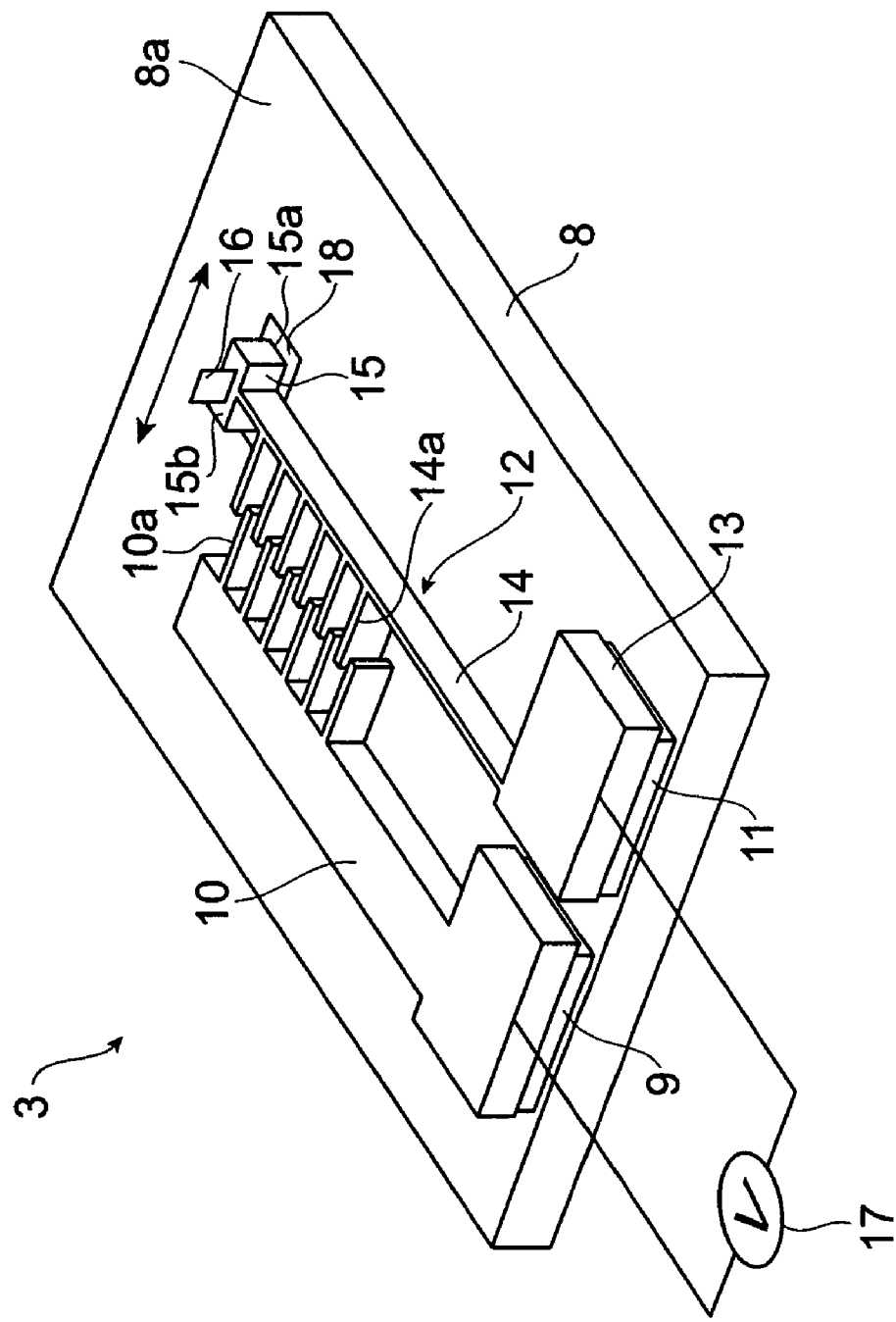
FIG. 3 is a perspective view of an actuator structure shown in FIG. 1.

The actuator structure 3 is one fabricated by use of the Micro-Electro-Mechanical System (MEMS) technology. The actuator structure 3, as shown in FIGS. 1 to 3, has an Si substrate 8, a stationary comb electrode 10 provided through an oxide film layer 9 on a surface 8a of the Si substrate 8, and a movable comb electrode 12 provided through an oxide film layer 11 on the surface 8a of the Si substrate 8 so as to be juxtaposed to the stationary comb electrode 10. The stationary comb electrode 10 and the movable comb electrode 12 are made, for example, of an electrically conductive Si or the like.

The movable comb electrode 12 has an electrode base 13 placed on the oxide film layer 11, and a movable portion 14 integrally formed with the electrode base 13 and extending in parallel with the stationary comb electrode 10, and a pedestal 15 of rectangular parallelepiped shape is provided at the tip of this movable portion 14. Comb teeth 14a are provided in the tip part of the movable portion 14 and on the side facing comb teeth 10a of the stationary comb electrode 10. The movable portion 14 is floating from the surface 8a of the Si substrate 8 so as to ensure operation in good order.

Namely, the movable electrode 12 has the movable portion 14 extending from the electrode base 13, and this movable portion 14 extends along the surface 8a of the substrate 8 and is separated from the surface 8a. In addition, the movable electrode 12 has a plurality of comb teeth 14a in the tip part of this movable portion 14, and the comb teeth 14a extend in a direction intersecting with the movable portion 14 (i.e., the direction toward the stationary electrode 10). Furthermore, the movable electrode 12 has the pedestal 15 at the tip of the movable portion 14.

On the other hand, the stationary electrode 10 has an arm extending substantially in the same direction as the movable portion 14, and a plurality of comb teeth 10a extending in a direction intersecting with the arm (i.e., the direction toward the movable electrode 12) in the tip part of this arm. The arm and comb teeth 10a of the stationary electrode 10 are fixed relative to the substrate 8.

The length p of the movable portion 14 is, for example, not less than 100 μm. The distance (thickness of the oxide film layer 11) g between the Si substrate 8 and the movable portion 14 is preferably not more than 10 μm. The area of a lower surface (surface on the Si substrate 8 side) 15a of the pedestal 15 is preferably larger than 100 μm$^2$.

A mirror 16 is fixed to an upper surface (surface opposite to the Si substrate 8 side) 15b of the pedestal 15. This mirror 16 is an optical element for reflecting light emerging from the optical waveguide core 6A of the planar optical waveguide 2, toward the optical waveguide core 6B.

A voltage supply 17 is connected between the stationary comb electrode 10 and the movable comb electrode 12. When this voltage supply 17 applies a voltage to the stationary comb electrode 10, an electrostatic force is generated between the stationary comb electrode 10 and the movable comb electrode 12, and this electrostatic force attracts the movable comb electrode 12 toward the stationary comb electrode 10 to bend the movable comb electrode 12, whereupon the mirror 16 moves toward the stationary comb electrode 10.

Figure 4:
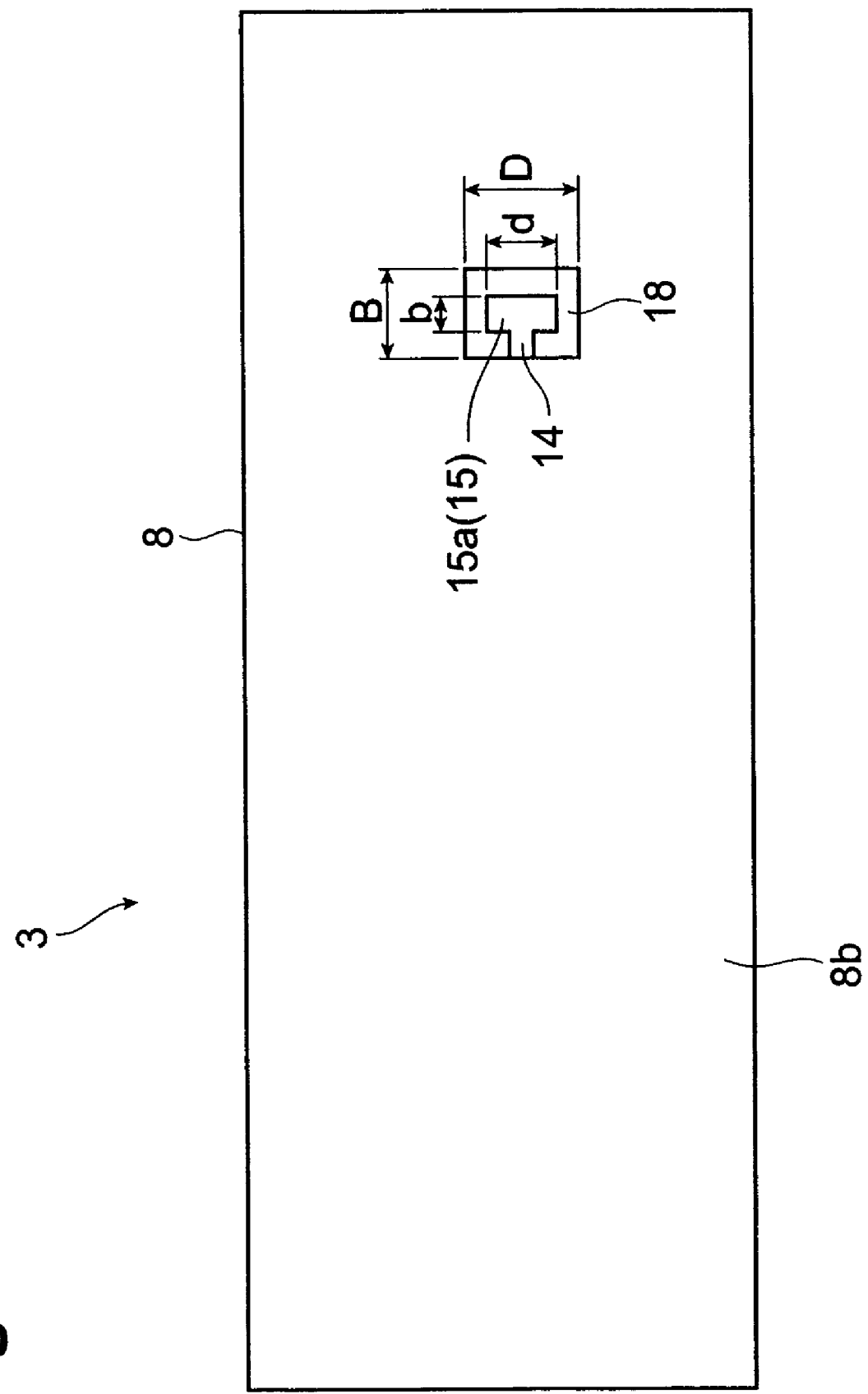
FIG. 4 is a back view of the actuator structure shown in FIG. 3.

A through hole 18 penetrating the Si substrate 8 from front to back is formed in a part of the Si substrate 8 facing the pedestal 15 of the movable comb electrode 12. Namely, the Si substrate 8 is provided with the through hole (hole portion) 18 penetrating the substrate in a direction intersecting with the lower surface 15a of the pedestal 15, in the part facing the lower surface 15a of the pedestal 15. This through hole 18 has such a rectangular cross section as to expose the whole of the lower surface 15a of the pedestal 15, as shown in FIG. 4. Let d be a length on a side of the lower surface 15a, b be a length on the other side of the lower surface 15a, D be a length on a side of the through hole 18 (a side corresponding to the length d), and B be a length on the other side of the through hole 18 (a side corresponding to the length b). It is then preferable that the following three relations be satisfied.

$$d \times b < D \times B < d \times b \times 1.5$$

$$d < D < d \times 1.5$$

$$b < B < b \times 1.5$$

Within this range, it is feasible to prevent degradation of rigidity of the actuator structure 3.

The interior of the package 4, which houses the planar optical waveguide 2 and the actuator structure 3 as described above, is filled with a matching oil 19 for index matching. This causes the actuator structure 3 to be entirely immersed in the matching oil 19. The matching oil 19 used herein is, for example, silicone oil or the like.

Next, a method of producing the above-described optical switch 1 will be described with reference to FIG. 5. First, an actuator structure 20 as shown in (a) in FIG. 5 is fabricated. Specifically, the stationary comb electrode 10 is formed through the oxide film layer 9 on the surface 8a of the Si substrate 8 and the movable comb electrode 12 is formed through the oxide film layer 11 on the surface 8a of the Si substrate 8. Then the mirror 16 is provided at the tip end of the movable comb electrode 12.

Subsequently, as shown in (b) in FIG. 5, a pattern of an oxide film layer 21 as an etching mask is formed on the back surface 8b of the Si substrate 8. Then, as shown in (c) in FIG. 5, the Si substrate 8 is subjected to dry etching with the oxide film layer 21 as a mask from the back surface 8b of the Si substrate 8, thereby forming the through hole 18 in the part of the Si substrate 8 facing the pedestal 15 of the movable comb electrode 12. The dry etching adopted at this time is, for example, RIE (Reactive Ion Etching) with an etching gas such as NF$_3$ gas. Use of this method permits etching of the Si substrate 8 at a high etching rate. In addition, the through hole 18 can be formed in the Si substrate 8 with good position accuracy.

At this time, the oxide film layer 11 as a sacrifice layer undergoing little etching with the etching gas remains between the movable portion 14 of the movable comb electrode 12 and the Si substrate 8, and the oxide film layer 11 serves as an etching stop to prevent the movable portion 14 from being etched. This makes it feasible to prevent damage of the movable portion 14.

Subsequently, as shown in (d) in FIG. 5, wet etching is carried out to remove the oxide film layer (sacrifice layer) 11 existing between the movable portion 14 and the Si substrate 8, to leave the oxide film layer 11 only between the electrode base 13 and the Si substrate 8, and to remove the oxide film layer 21 existing on the back surface 8b of the Si substrate 8. The etchant used herein is, for example, HF or the like. This ends up with obtaining the actuator structure 3 as shown in FIG. 3.

Since in this configuration the space between the movable portion 14 and the Si substrate 8 is very narrow, not more than 10 μm, and the area of the lower surface 15a of the pedestal 15 provided at the tip of the movable portion 14 is larger than 100 μm$^2$, the so-called stiction, which causes sticking of the movable portion 14 (pedestal 15) and the Si substrate 8 due to surface tension of the etchant, is likely to occur during the removal of the oxide film layer 11. However, since the through hole 18 is formed in the part of the Si substrate 8 facing the pedestal 15, it is feasible to securely prevent the stiction between the Si substrate 8 and the movable portion 14.

Thereafter, the actuator structure 3 fabricated as described above is turned upside down, and the actuator structure 3 is bonded to the upper surface of the planar optical waveguide 2 so as to set the mirror 16 in the trench 5 of the planar optical waveguide 2 prepared separately. Then the planar optical waveguide 2 to which the actuator structure 3 is fixed is housed in the package 4. Then the interior of the package 4 is filled with the matching oil 19 to hermetically seal the planar optical waveguide 2 and the actuator structure 3 inside in that state.

When the optical switch 1 as described above is in a normal state in which the voltage applied by the voltage supply 17 is zero, the movable portion 14 of the movable comb electrode 12 extends straight, as shown in FIG. 2. In this state, the light emerging from the optical waveguide core 6A is reflected by the mirror 16 to enter the optical waveguide core 6B.

On the other hand, when the voltage supply 17 applies a predetermined voltage to the stationary comb electrode 10, the tip part of the movable portion 14 bends by virtue of the electrostatic force generated between the stationary comb electrode 10 and the movable comb electrode 12 to move the mirror 16 toward the stationary comb electrode 10. In this state, the light emerging from the optical waveguide core 6A passes through the interior of the trench 5 to enter the optical waveguide core 6C on the opposite side.

At this time, the refractive index of the optical waveguide cores 6A–6C is matched with the refractive index inside the trench 5, because the interior of the package 4 is filled with the matching oil 19. This suppresses reflection of light on boundary surfaces between the end faces of the optical waveguide cores 6A–6C and the trench 5, so as to enable reduction of the insertion loss.

Since the actuator structure 3 is immersed in the matching oil 19 as described above, the shear stress is exerted on the matching oil 19 during motion of the movable portion 14 of the movable comb electrode 12.

Figure 6:
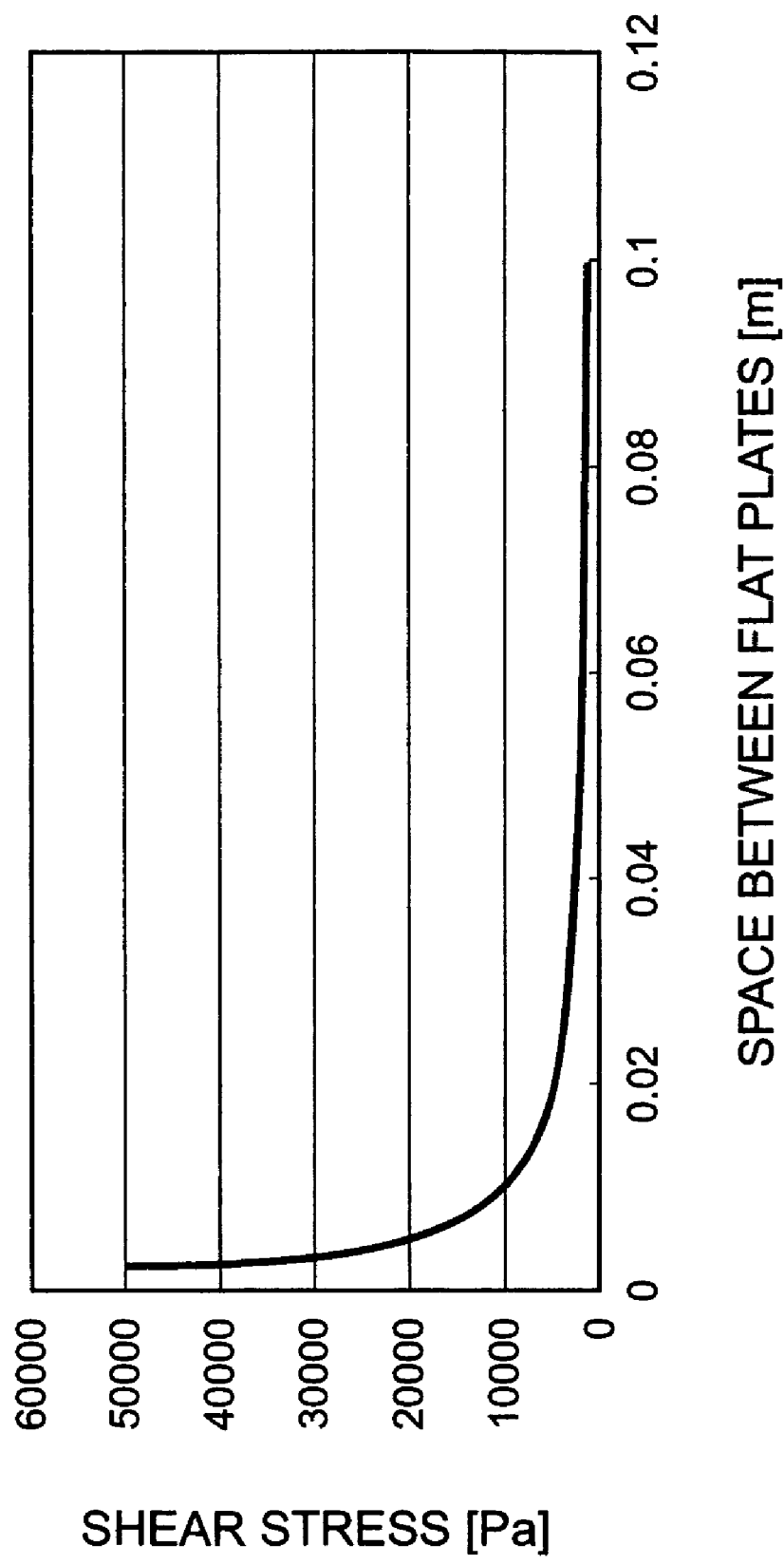
FIG. 6 is a graph showing an example of relationship between the space between two flat plates and shear stress appearing in a flat plate.

FIG. 6 shows an example of relationship between the space between two flat plates placed in parallel and the shear stress occurring in a flat plate. This figure shows that the shear stress exponentially increases with decrease in the distance between the flat plates, provided that a force is exerted on one of the two flat plates and the speed distribution during motion of the flat plate conforms to the Couette flow.

This theory can also be applied to the present embodiment. Specifically, the shear stress on the matching oil 19 increases with decrease in the space g between the Si substrate 8 and the movable portion 14. This increase of the shear stress results in increasing the shear resistance (viscous drag) and thus decreasing the driving speed of the movable portion 14, so that the switching time of the optical switch becomes longer.

In contrast to it, since the present embodiment adopts the configuration wherein the through hole 18 is provided in the part of the Si substrate 8 facing the pedestal 15 of the movable comb electrode 12, the space is enlarged on the Si substrate 8 side with respect to the pedestal 15. For this reason, the shear stress on the matching oil 19 is reduced in motion of the movable portion 14, so as to decrease the shear resistance, and this results in increasing the driving speed of the movable portion 14. Therefore, it is feasible to reduce the switching time of the optical switch 1. Since the shear resistance during operation of the movable portion 14 is reduced, it is also feasible to lengthen the lifetime of the actuator structure 3 (movable comb electrode 12).

Figure 7:
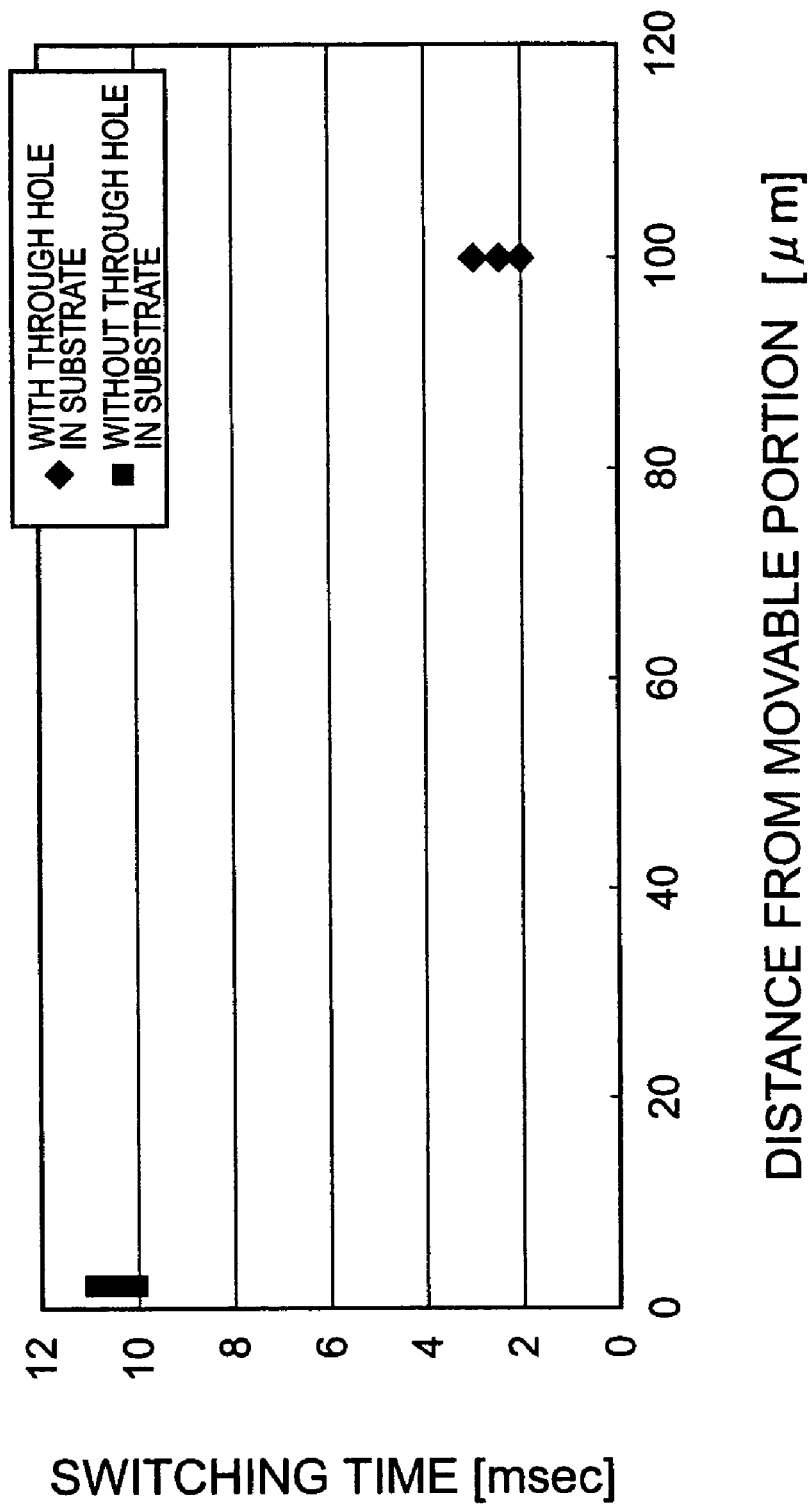
FIG. 7 is a graph showing results of measurement to measure the switching time of optical switches.

FIG. 7 shows the results of measurement to measure the switching time of optical switches 1 with the through hole 18 in the Si substrate 8 and without the through hole 18 in the Si substrate 8. In this measurement, the two cases were evaluated ten times each. In FIG. 7, the horizontal axis of the graph represents the distance from the movable portion 14 of the movable comb electrode 12 on the back surface 8b side of the Si substrate 8, and the vertical axis of the graph the switching time. The switching time stated herein is a duration of time from a fall of an optical signal of light reflected by the mirror 16 and entering the optical waveguide core 6B, to a time when the power of an optical signal of light entering the optical waveguide core 6C with movement of the mirror 16 becomes stabilized.

In the case without the through hole 18 in the Si substrate 8, the distance from the movable portion 14 (the space between the Si substrate 8 and the movable portion 14) is 2 μm, and the switching time in this case was 10.43 ms on average (cf. square marks in the graph). On the other hand, in the case with the through hole 18 in the Si substrate 8, the distance from the movable portion 14 (a total of the space between the Si substrate 8 and the movable portion 14, and the thickness of Si substrate 8) is 100 μm. The shear stress occurring in this case is about one fiftieth of that in the case without the through hole 18, as seen from FIG. 6. Then the switching time in this case was 2.32 ms on average and thus the switching time was remarkably reduced (cf. rhomboid marks in the graph) in comparison with the case without the through hole 18.

Since the present embodiment adopts the configuration wherein the interior of the package 4 is filled with the matching oil 19 as described above, it is feasible to achieve the reduction of the optical loss. Since the through hole 18 is formed in the Si substrate 8, even if the actuator structure 3 is immersed in the matching oil 19, the desired driving speed of the movable comb electrode 12 is secured, whereby the switching time of the optical switch 1 can be decreased.

Furthermore, the through hole 18 is formed in the Si substrate 8, whereby the stiction is prevented between the movable portion 14 of the movable comb electrode 12 and the Si substrate 8; therefore, when a voltage is applied between the stationary comb electrode 10 and the movable comb electrode 12, the movable portion 14 is driven according to an intended operation.

Figure 8:
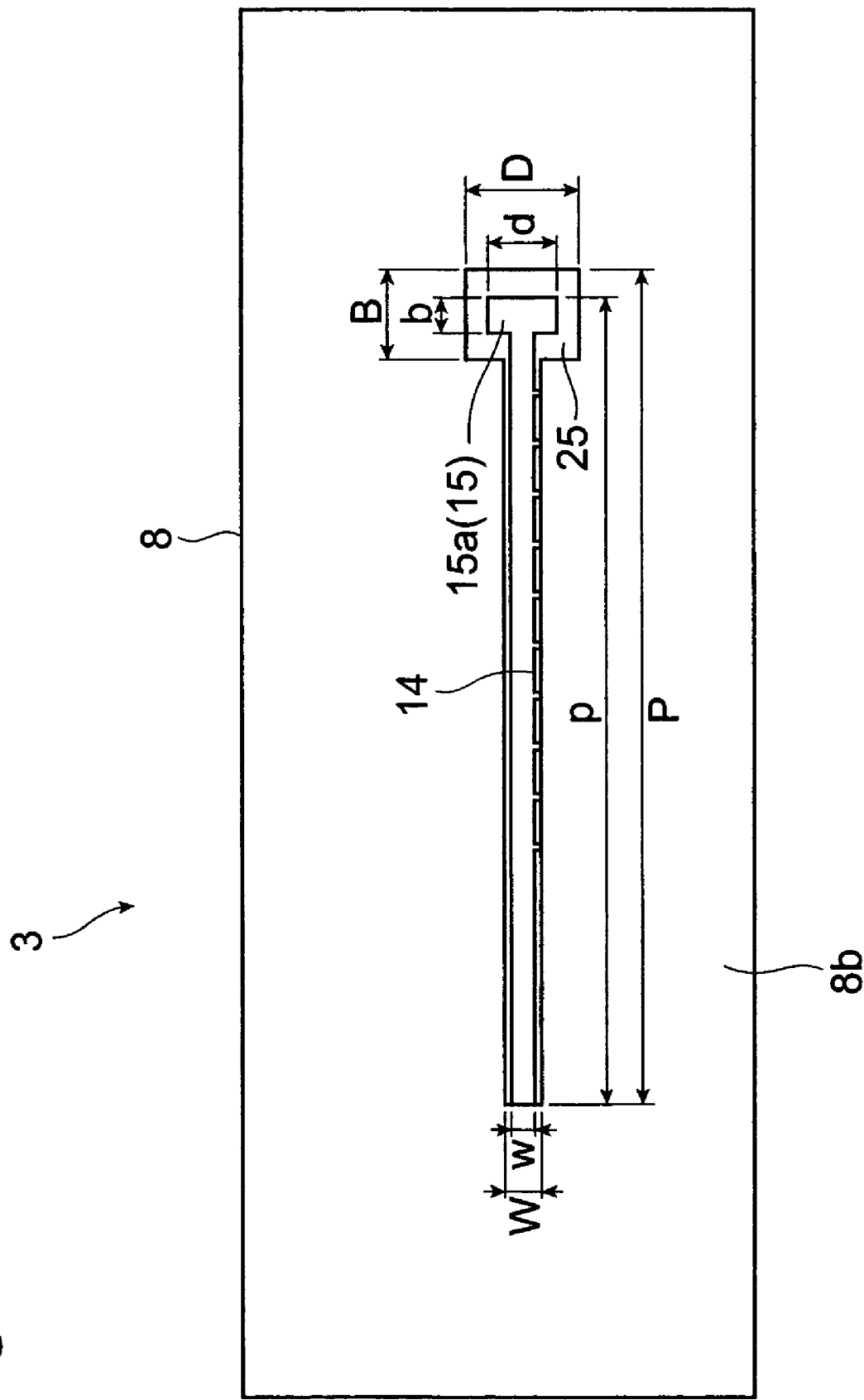
FIG. 8 is a back view showing a modification example of the actuator structure shown in FIG. 3.

FIG. 8 shows a modification example of the above embodiment. In the same figure, the Si substrate 8 is provided with a through hole 25 extending along the movable portion 14 of the movable comb electrode 12. Namely, the through hole (hole portion) 25 is provided in the part of the Si substrate 8 facing the surface on the substrate 8 side of the movable portion 14 and in the part of the Si substrate 8 facing the lower surface 15a of the pedestal 15, and this through hole 25 penetrates the substrate 8 in the direction intersecting with the surface on the substrate 8 side of the movable portion 14. This through hole 25 is formed by etching similar to that in the above embodiment, across the entire movable portion 14 from the back surface 8b of the Si substrate 8.

In this case, the shape and size of the portion corresponding to the pedestal 15 in the through hole 25 are similar to those in the above embodiment. Let p be the length of the movable portion 14, w be the width of the extending part of the movable portion 14, P be the length of the through hole 25, and W be the width of the extending part of the through hole 25. Then it is desirable that the following relations be satisfied:

$w < W < w \times 1.5;$ $p < P < p \times 1.5.$

Within this range, it is feasible to securely prevent the stiction between the movable portion 14 and the Si substrate 8 and to suppress degradation of rigidity of the actuator structure 3.

The sectional shape of the through hole formed in the Si substrate 8 is not limited to the above-described shape in particular, but may be modified in various ways according to the shape of the pedestal 15 and others; for example, it may be a slit shape, a circular shape, or the like. The method of forming the through hole is not limited to the etching as described above, but may also be, for example, machining of the Si substrate 8. In this case, it is preferable to preliminarily form the through hole in the Si substrate 8, prior to the step of providing the movable comb electrode 12 on the surface 8a of the Si substrate 8. Furthermore, the through hole may be replaced with a recessed hole portion or a step portion of slit shape, circular shape, or the like formed in the Si substrate 8. Furthermore, any other shape can also be adopted as long as it can expand the distance between the facing surfaces of the Si substrate 8 and the movable comb electrode 12.

Figure 9:
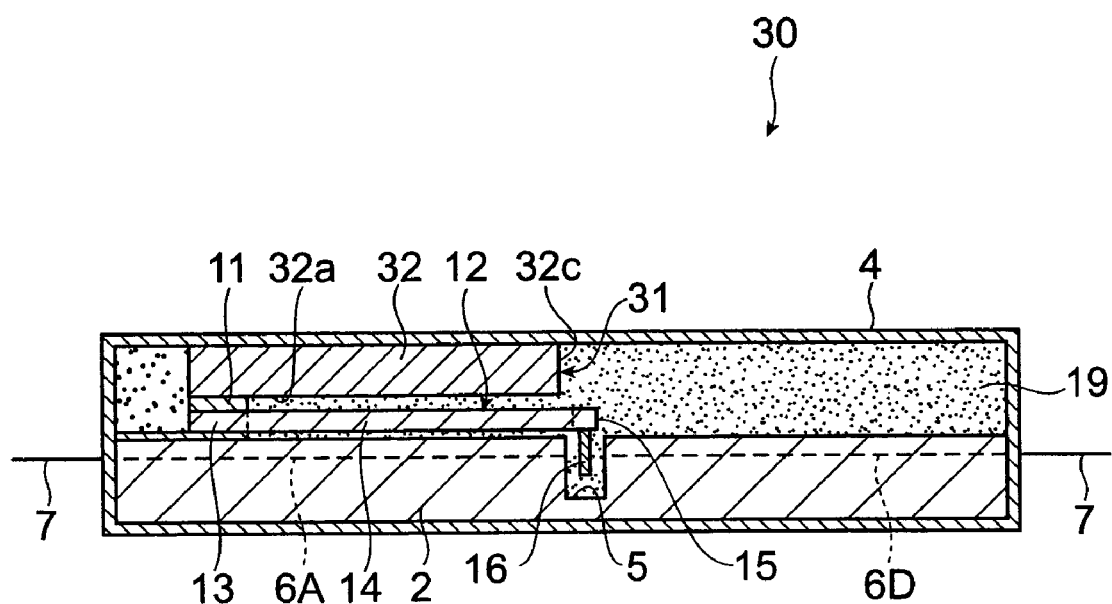
FIG. 9 is a vertical sectional view showing another embodiment of an optical device according to the present invention.

FIG. 9 is a vertical sectional view showing another embodiment of the optical device (optical switch) according to the present invention. In the drawing identical or equivalent members to those in the aforementioned embodiment are denoted by the same reference symbols and the description thereof is omitted herein.

Figure 10:
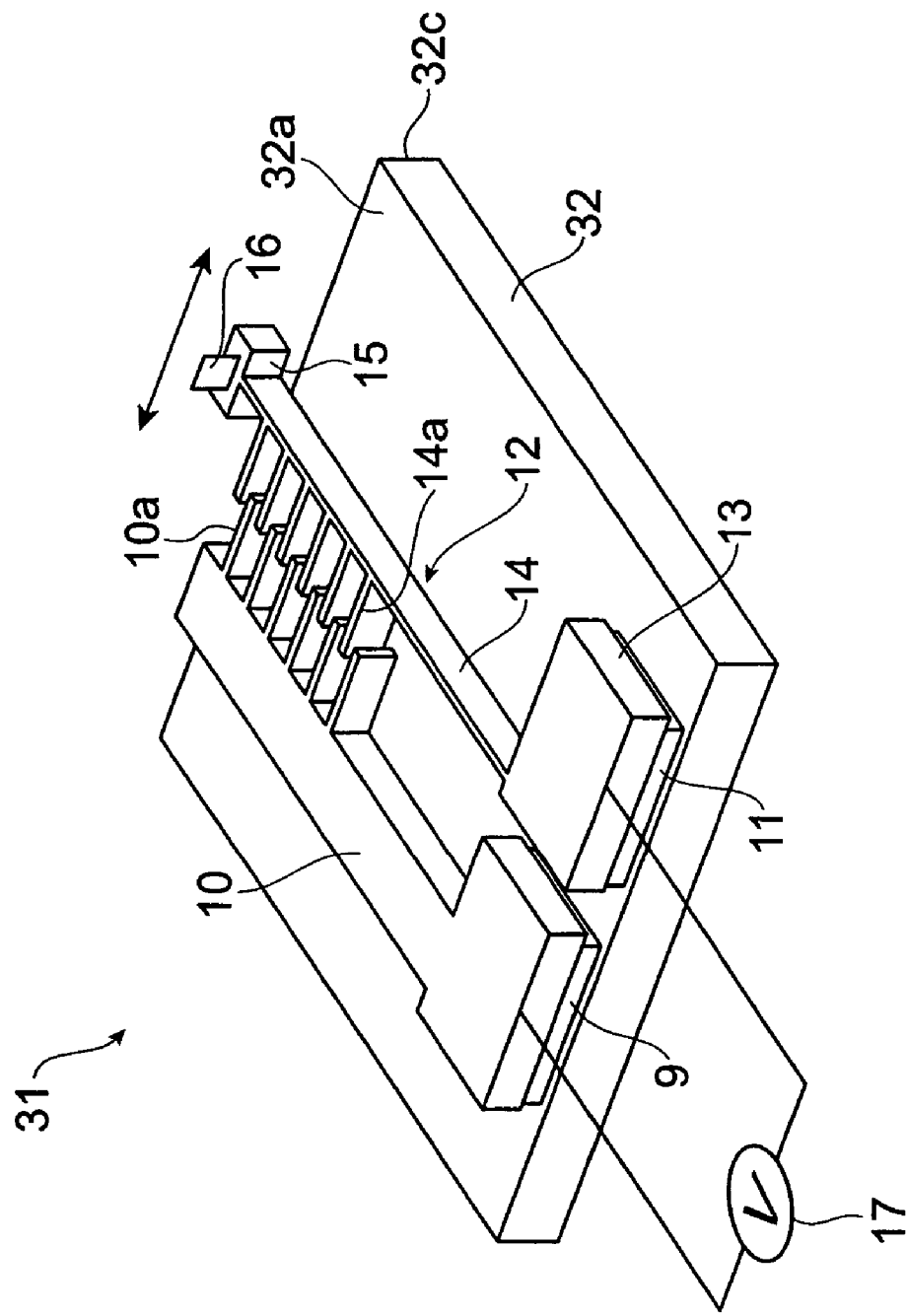
FIG. 10 is a perspective view of the actuator structure shown in FIG. 9.

In FIG. 9, the optical switch 30 of the present embodiment has an actuator structure 31, in place of the actuator structure 3 in the aforementioned embodiment. The actuator structure 31, as shown in FIG. 10, has an Si substrate 32, and a stationary comb electrode 10 and a movable comb electrode 12 provided on a surface 32a of the Si substrate 32.

The tip part of the movable portion 14 including the pedestal 15 of the movable comb electrode 12 extends out from an end face 32c of the Si substrate 32. Namely, the configuration is such that the Si substrate 32 does not exist in the part facing the pedestal 15. Such actuator structure 31 is fabricated by etching or machining of the Si substrate 32.

This configuration can also exert the same effect as in the case where the hole portion is formed in the Si substrate 8 like the aforementioned embodiment. Namely, the shear stress on the matching oil 19 is reduced in motion of the movable portion 14 of the movable comb electrode 12, so as to increase the driving speed of the movable portion 14 and thus enable reduction of the switching time of the optical switch 30. In the fabrication step of the actuator structure 31, the stiction can also be prevented between the movable portion 14 and the Si substrate 32 during removal of the oxide film layer (sacrifice layer) 11 with an etchant.

For producing the optical switch 30 of this structure, the actuator structure 31 is first prepared, and the actuator structure 31 is bonded to the upper surface of the planar optical waveguide 2. The planar optical waveguide 2 with the actuator structure 31 fixed thereto is housed in the package 4 and the interior of the package 4 is filled with the matching oil 19.

The present invention is by no means limited to the above embodiments. For example, the above embodiments adopted the configuration wherein the entire actuator structure was immersed in the matching oil 19, but a necessary configuration for achieving the increase of speed of the movable portion 14 of the movable comb electrode 12 while reducing the optical loss is that the region in the vicinity of the movable comb electrode 12 where the optical element such as the mirror 16 is provided is immersed in the matching oil 19.

The hole provided in the substrate 8 does not have to be limited to the above through hole 18, 25. Namely, the point is that the hole is provided in at least a part of the portion of the substrate 8 facing portion movable in the movable electrode 12, e.g., the movable portion 14 or the pedestal 15. The hole is not limited to the through hole, but may be any hole of a predetermined depth as long as it has a shape capable of reducing the shear stress.

The optical devices of the above embodiments were the optical switches, but the optical devices of the present invention are also applicable to optical variable attenuators, dispersion compensators, and so on.

As described above with the preferred embodiments of the present invention, the present invention successfully reduces the insertion loss in the operation of guiding the light emerging from an optical waveguide, into another optical waveguide. In addition, the driving speed of the movable electrode can be increased, and, for example, where the optical device is applied to an optical switch, the switching time of the optical switch can be reduced.

What is claimed is:

1. An optical device comprising an actuator structure, wherein the actuator structure comprises:
   a substrate having a first surface and a second surface opposing the first surface;
   a stationary electrode provided on the first surface of the substrate;
   a movable electrode provided on the first surface of the substrate, the movable electrode having a lower surface facing the first surface and an upper surface opposing the lower surface;
   an optical element provided on the upper surface of the movable electrode; and
   a hole portion formed in a part of the substrate and providing a space which extends in a direction from the first surface to the second surface and provides the first surface with an opening, where the substrate faces the movable electrode,
   wherein a region in the vicinity of the movable electrode where the optical element is provided is immersed in a matching oil.

2. The optical device according to claim 1, wherein the part of the substrate is a part facing the optical element in the substrate.

3. The optical device according to claim 1, wherein the part of the substrate is a part facing the movable electrode in the substrate.

4. The optical device according to claim 1, wherein the hole portion is a through hole.

5. The optical device according to claim 1, wherein a space between a plane along the surface of the substrate and a plane of the movable electrode facing the substrate is not more than 10 µm.

6. The optical device according to claim 1, wherein the optical element is a mirror.

7. The optical device according to claim 1, further comprising an optical waveguide optically coupled to the optical element,
   wherein the matching oil is provided at least between the optical waveguide and the optical element and between the movable electrode and the hole portion.

8. The optical device according to claim 1, wherein the optical waveguide is an optical waveguide core in a planar light circuit.

9. An optical device comprising an actuator structure, wherein the actuator structure comprises:
a substrate having a first surface, a second surface opposing the first surface, and an end surface intersecting with the first surface and the second surface;
a stationary electrode provided on the first surface of the substrate;
a movable electrode provided on the first surface of the substrate and provided with a portion extending out from the end face of the substrate, the movable electrode having a lower surface facing the first surface and an upper surface opposing the lower surface;
an optical element provided on the upper surface of the portion of the movable electrode extending out from the end face of the substrate; and
an optical waveguide optically coupled to the optical element,
wherein a region in the vicinity the movable electrode where the optical element is provided is immersed in a matching oil, and
wherein the matching oil is provided at least between the optical waveguide and the optical element and between the movable electrode and a hole portion.

10. The optical device according to claim 9, wherein a space between a plane along the surface of the substrate and a plane of the movable electrode facing the substrate is not more than 10 µm.

11. The optical device according to claim 9, wherein the optical element is a mirror.

12. The optical device according to claim 9, wherein the optical waveguide is an optical waveguide core in a planar light circuit.

13. A method of producing an optical device, the method comprising:
a step of providing a stationary electrode on a first surface of a substrate, the substrate having the first surface and a second surface opposing the first surface;
a step of providing a movable electrode on the first surface of the substrate so that the movable electrode has a lower surface facing the first surface and an upper surface opposing the lower surface;
a step of providing an optical element on the upper surface of the movable electrode;
a step of forming a hole portion in the substrate so that the hole portion provides a space which extends in a direction from the first surface to the second surface and provides the first surface with an opening, where the substrate has a part facing the movable electrode; and
a step of immersing a region in the vicinity of the movable electrode where the optical element is provided, in a matching oil.

14. The method according to claim 13, wherein the hole portion is formed by removing the substrate from a back surface of the substrate.

15. The method according to claim 14, comprising forming the movable electrode through a sacrifice layer on the surface of the substrate, effecting etching from the back surface of the substrate to form the hole portion, and thereafter removing the sacrifice layer.

16. The method according to claim 13, comprising preliminarily forming the hole portion in the substrate, prior to the step of providing the movable electrode on the surface of the substrate.

17. The method according to claim 13, further comprising a step of providing an optical waveguide optically coupled to the optical element,
wherein the matching oil is provided at least between the optical waveguide and the optical element and between the movable electrode and the hole portion.

18. A method of producing an optical device, the method comprising:
a step of providing a stationary electrode on a first surface of a substrate, the substrate having the first surface, a second surface opposing the first surface, and an end surface intersecting with the first surface and the second surface;
a step of providing a movable electrode on the surface of the substrate so as to have a portion extending out from the end face of the substrate and have a lower surface facing the first surface and an upper surface opposing the lower surface;
a step of providing an optical element on the upper surface of the movable electrode;
a step of immersing a region near the movable electrode where the optical element is provided, in a matching oil; and
a step of providing an optical waveguide optically coupled to the optical element,
wherein the matching oil is provided at least between the optical waveguide and the optical element and between the movable electrode and a hole portion.

* * * * *